United States Patent
Kobayashi et al.

(10) Patent No.: US 9,967,497 B2
(45) Date of Patent: May 8, 2018

(54) IMAGING APPARATUS AND DRIVING METHOD FOR IMAGING APPARATUS

(71) Applicant: CANON KABUSHIKI KAISHA, Tokyo (JP)

(72) Inventors: Hideo Kobayashi, Tokyo (JP); Tetsunobu Kochi, Hiratsuka (JP); Masanori Ogura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 693 days.

(21) Appl. No.: 14/039,183

(22) Filed: Sep. 27, 2013

(65) Prior Publication Data

US 2014/0091202 A1    Apr. 3, 2014

(30) Foreign Application Priority Data

Oct. 2, 2012 (JP) .................................. 2012-220389

(51) Int. Cl.
| | |
|---|---|
| H01L 27/00 | (2006.01) |
| H04N 5/378 | (2011.01) |
| H04N 5/357 | (2011.01) |
| H04N 5/369 | (2011.01) |

(52) U.S. Cl.
CPC ............. *H04N 5/378* (2013.01); *H04N 5/357* (2013.01); *H04N 5/3698* (2013.01)

(58) Field of Classification Search
CPC ....... H04N 5/378; H04N 5/3698; H04N 5/357
USPC .................................................. 250/208.1
See application file for complete search history.

(56) References Cited

U.S. PATENT DOCUMENTS

| | | | | |
|---|---|---|---|---|
| 6,429,413 B1* | 8/2002 | Kawahara | ............ | H04N 5/2175 250/208.1 |
| 8,115,837 B2* | 2/2012 | Kishi | .................... | H04N 5/3532 250/208.1 |
| 8,988,568 B2* | 3/2015 | Nakamura | ........... | H04N 3/1568 348/294 |
| 2002/0057355 A1* | 5/2002 | Sakuragi | ................ | H04N 5/357 348/308 |
| 2005/0253043 A1* | 11/2005 | Purcell | ................... | H04N 5/335 250/208.1 |
| 2006/0243885 A1* | 11/2006 | Watanabe | ............ | H04N 3/1593 250/208.1 |
| 2008/0204822 A1* | 8/2008 | Yamamoto | ............. | H04N 5/335 358/482 |
| 2010/0053392 A1* | 3/2010 | Sawada | ................... | H04N 5/378 348/294 |
| 2010/0079649 A1* | 4/2010 | Ayraud | ................ | H04N 5/3698 348/308 |

(Continued)

FOREIGN PATENT DOCUMENTS

| | | |
|---|---|---|
| JP | H08-251483 A | 9/1996 |
| JP | 11-234472 A | 8/1999 |

(Continued)

*Primary Examiner* — Thanh Luu
*Assistant Examiner* — Kevin Wyatt
(74) *Attorney, Agent, or Firm* — Canon U.S.A., Inc. IP Division

(57) ABSTRACT

An aspect of the present disclosure is directed to an imaging apparatus capable of reducing fluctuation in voltage in a current supply line due to fluctuation in a current consumption amount generated when an output circuit shifts from a first state to a second state, and a method for driving the imaging apparatus.

11 Claims, 12 Drawing Sheets

(56) References Cited

U.S. PATENT DOCUMENTS

2012/0188422 A1* 7/2012 Cho .................... H04N 5/2258
                                                    348/280
2012/0205520 A1* 8/2012 Hsieh ................ H01L 27/14605
                                                    250/208.1

FOREIGN PATENT DOCUMENTS

| JP | H11-225252 A | 8/1999 |
| JP | 2006-352621 A | 12/2006 |

* cited by examiner

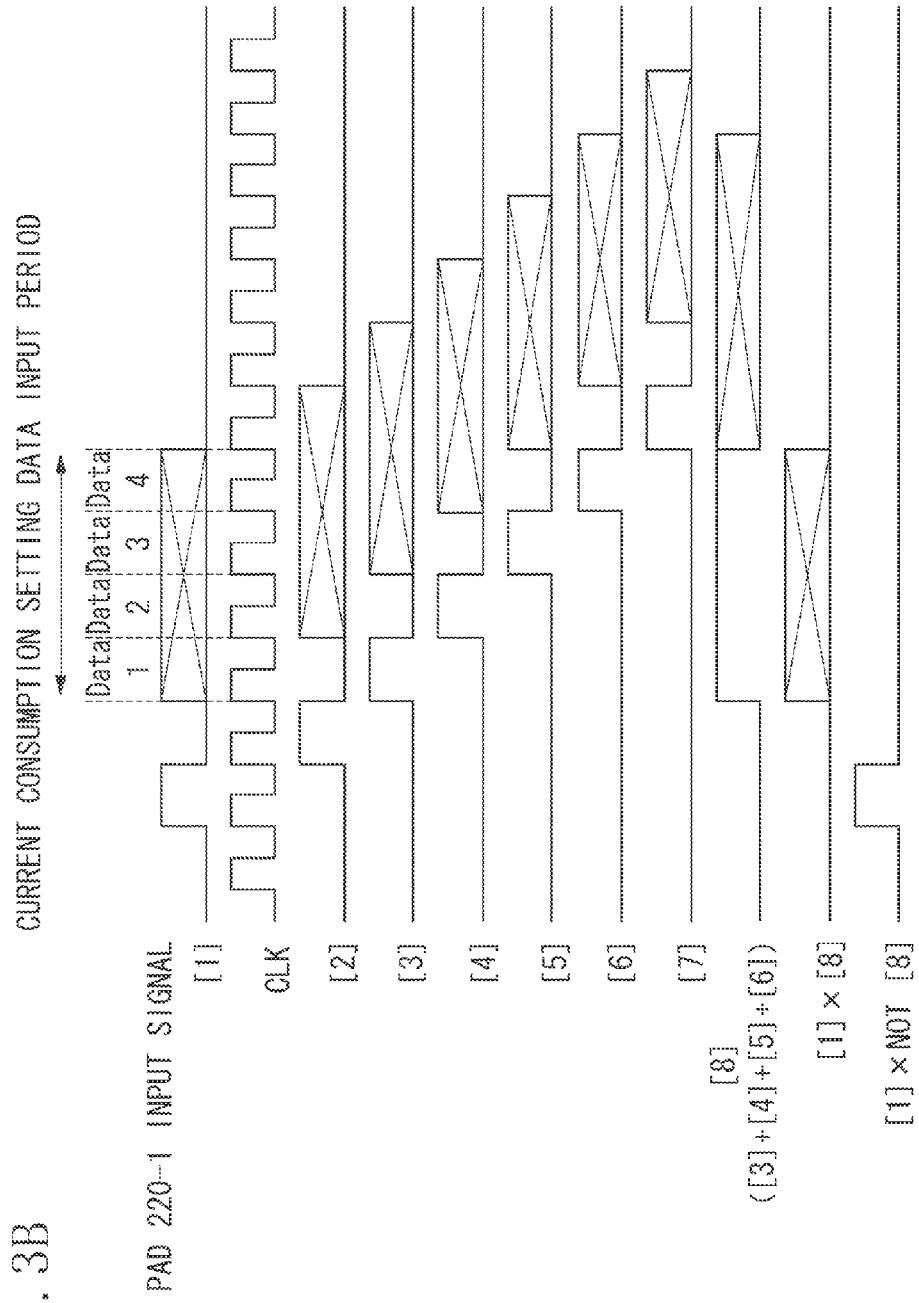

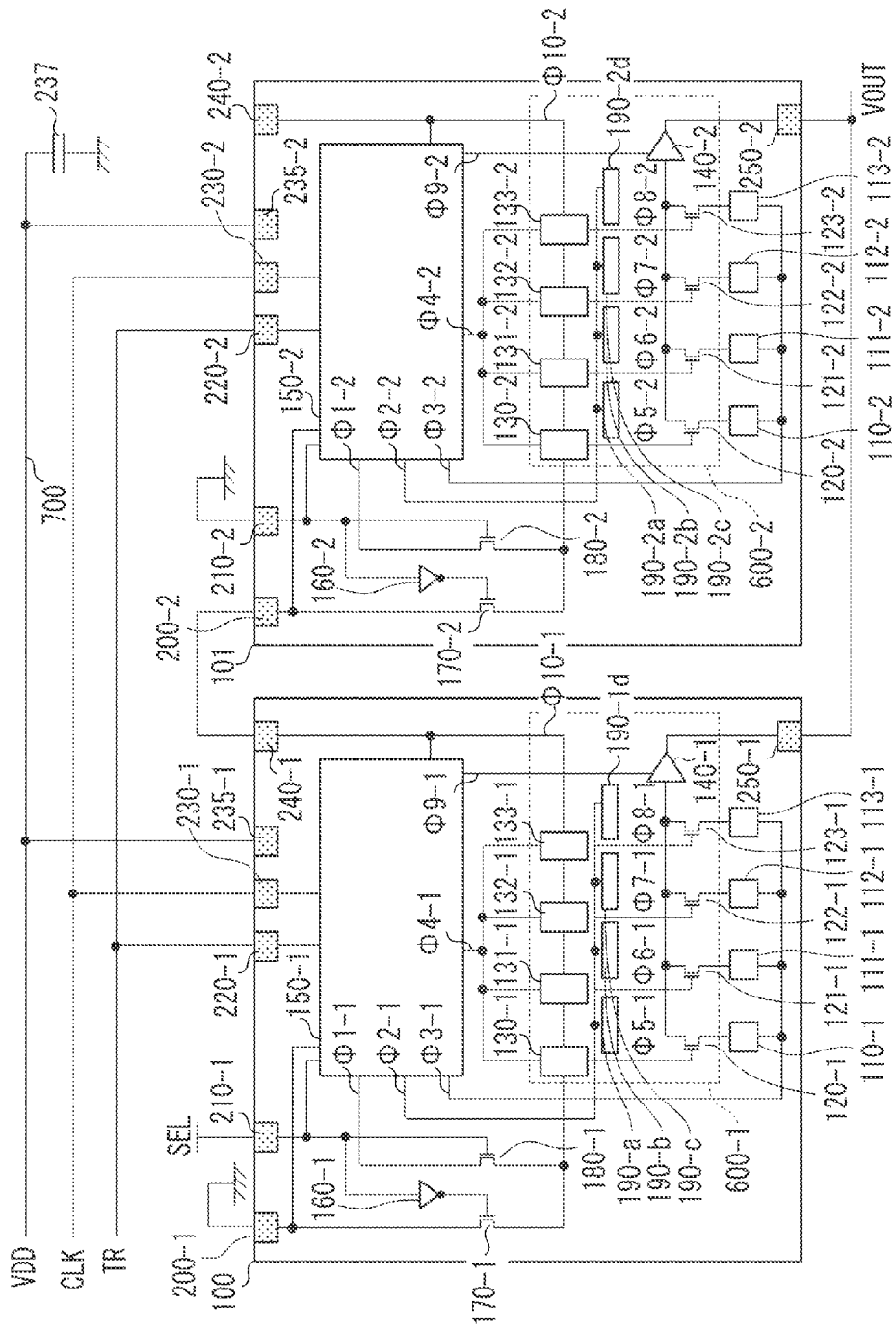

IMAGING APPARATUS AND DRIVING METHOD FOR IMAGING APPARATUS

BACKGROUND OF THE INVENTION

Field of the Invention

One disclosed aspect of the embodiments relates to an imaging apparatus provided with a plurality of chips including pixels and a method for driving the imaging apparatus.

Description of the Related Art

An imaging apparatus is known which includes a plurality of chips each outputting a signal obtained by photoelectrically converting incident light. As an example of such an imaging apparatus, Japanese Patent Application Laid-Open No. 11-234472 discusses an imaging apparatus which is provided with a plurality of chips each including a plurality of pixels for photoelectrically converting incident light to output an optical signal, a scanning circuit for sequentially outputting the optical signals from the plurality of pixels, and an output circuit for outputs signals based on the optical signals output by the scanning circuit. The imaging apparatus discussed in Japanese Patent Application Laid-Open No. 11-234472 has an output period during which the output circuit outputs the signals based on the optical signals and a blanking period during which the output circuit prepares for an operation during the output period.

SUMMARY OF THE INVENTION

According to an aspect of the embodiments, an imaging apparatus is provided with a plurality of chips each including a plurality of pixels each configured to photoelectrically convert incident light to generate an optical signal, an output circuit configured to output a signal based on the optical signal output from each of the plurality of pixels, and a current consumption circuit. The plurality of chips is electrically connected to a current supply line in common, and an electric current is provided from the current supply line to the output circuit and the current consumption circuit of each of the plurality of chips. The output circuit is capable of taking a first state and a second state, and the second state is a state in which a current consumption amount of the output circuit is larger than that in the first state. The current consumption circuit of each of the plurality of chips is a circuit that operates with a larger current consumption amount in the first state than a current consumption amount in the second state so as to reduce a difference of current consumption amounts of the output circuit between the first state and the second state.

According to another aspect of the embodiments, an imaging apparatus is provided with a plurality of chips each including a plurality of pixels each configured to photoelectrically convert incident light to generate an optical signal, and an output circuit configured to output a signal based on the optical signal output from each of the plurality of pixels. The plurality of chips is electrically connected to a current supply line in common, and an electric current is provided from the current supply line to the output circuit and the plurality of pixels of each of the plurality of chips. The output circuit is capable of taking a first state and a second state, and the second state is a state in which a current consumption amount of the output circuit is larger than that in the first state. A current consumption amount of all of the plurality of pixels due to generation of the optical signal performed by the plurality of pixels in the first state of the output circuit is smaller than a current consumption amount of the output circuit in the second state of the output circuit. The plurality of pixels performs, in the first state, an operation which is different from generation of the optical signal and consumes more electric current than in the second state so as to reduce a difference in current consumption amounts of the output circuit between the first state and the second state.

According to yet another aspect of the embodiments, a method for driving an imaging apparatus provided with a plurality of chips is provided. The plurality of chips each includes a plurality of pixels each configured to photoelectrically convert incident light to generate an optical signal, an output circuit configured to output a signal based on the optical signal output from each of the plurality of pixels, and a current consumption circuit. The plurality of chips is electrically connected to a current supply line in common, and an electric current is provided from the current supply line to the output circuit and the current consumption circuit of each of the plurality of chips. The output circuit is capable of taking a first state and a second state, and the second state is a state in which a current consumption amount of the output circuit is larger than that in the first state. The method includes operating the current consumption circuit of each of the plurality of chips with a larger current consumption amount in the first state than a current consumption amount in the second state so as to reduce a difference of current consumption amounts of the output circuit between the first state and the second state.

Further features of the disclosure will become apparent from the following description of exemplary embodiments with reference to the attached drawings.

BRIEF DESCRIPTION OF THE DRAWINGS

FIG. 3B is a timing chart illustrating an example of input operations of current consumption setting data.

FIG. 5A is a schematic diagram illustrating an example of a configuration of the imaging apparatus.

DESCRIPTION OF THE EMBODIMENTS

In a conventional imaging apparatus, voltage fluctuation occur on a current supply line that supplies electric current to the imaging apparatus due to fluctuation in a current consumption amount when an output circuit shifts from a first state with a low current consumption amount to a second state with a high current consumption amount. A noise included in a signal output by the output circuit is increased by the voltage fluctuation of the current supply line. In addition, if the imaging apparatus including a plurality of chips, the output circuits of the plurality of chips might simultaneously shift from the first state to the second state. In this case, there is an issue that a fluctuation range of the current consumption amount of the imaging apparatus is broadened, and a noise included in the signal which the chip outputs further increases.

An imaging apparatus and a method for driving the imaging apparatus according to each of exemplary embodiments described below solves the above-described issue.

An imaging apparatus according to a first exemplary embodiment will be described below with reference to the drawings. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 1A:
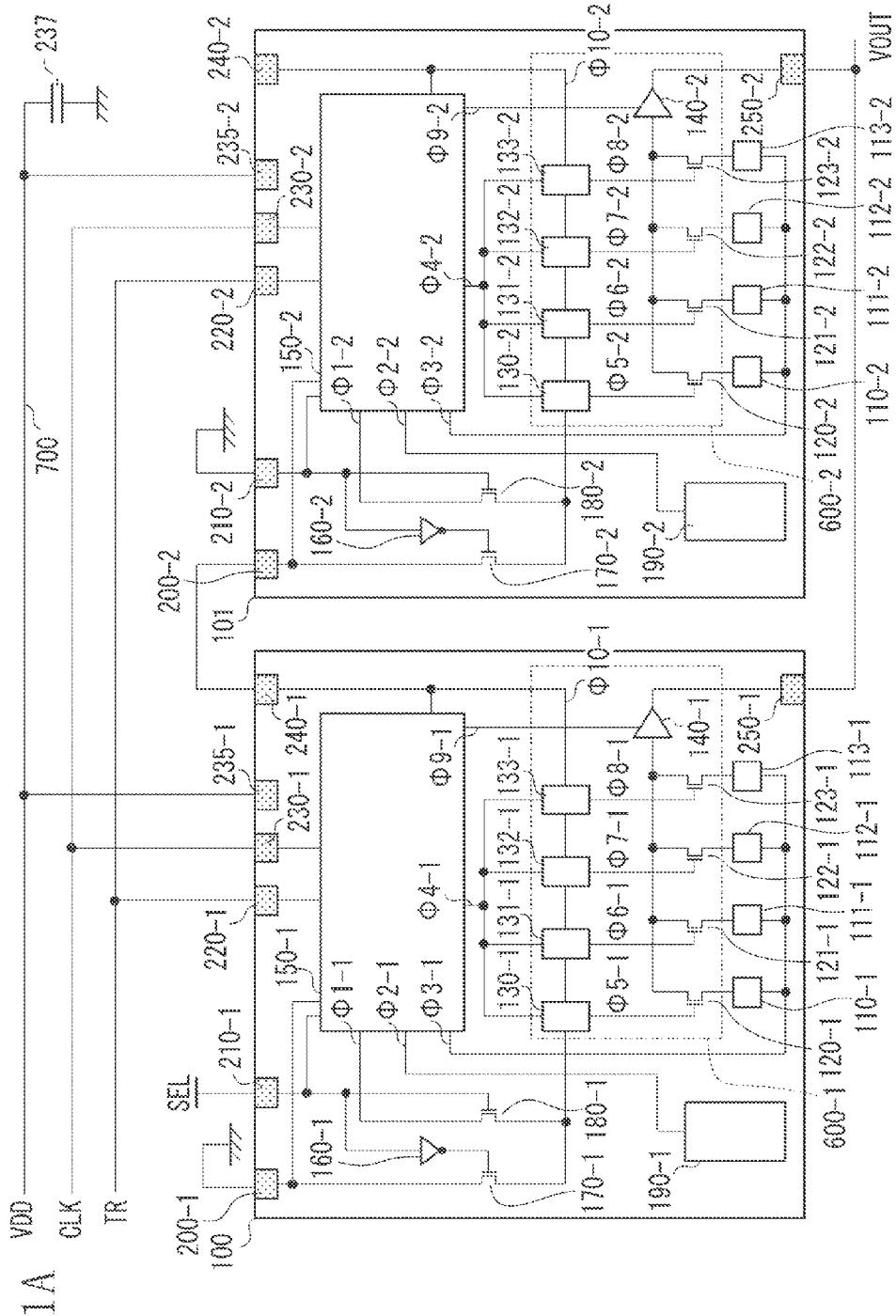
FIG. 1A is a schematic diagram illustrating an example of a configuration of an imaging apparatus.

FIG. 1A is a schematic diagram of an imaging apparatus according to the present exemplary embodiment. The imaging apparatus according to the present exemplary embodiment is an imaging apparatus including chips 100 and 101. Further, the imaging apparatus according to the present exemplary embodiment is an imaging apparatus including a multi-chip in which the chip 100 and the chip 101 are formed on separate semiconductor substrates.

In FIG. 1A, same members in the chips 100 and 101 are represented by the same reference numerals, and the members included in the chip 100 are indicated with a branch number "1", and the members included in the chip 101 are indicated with a branch number "2". For example, a pad 200 included in the chip 100 is denoted as a pad 200-1, and a pad 200 included in the chip 101 is denoted as a pad 200-2.

The chips 100 and 101 each include pads 200, 210, 220, 230, 235, and 240. The pad 200 is a pad to which a starting signal is given, but it is not used in the chip 100. The pad 200-2 is a pad to which a signal output from the pad 240-1 is given. The pad 210 is a pad to which a select signal SEL is given, and it is not used in the chip 101. Here, the pad which is not used refers to a state in which a fixed voltage instead of a pulse signal is given to the pad. A ground voltage is given to the pad 200-1, and the pad 210-2. When the select signal SEL of the pad 210 is set at a High level (hereinbelow, denoted as H level), a metal oxide semiconductor (MOS) transistor 180 is in a conductive state, and a MOS transistor 170 is in a non-conductive state. The pad 220 is a pad to which a trigger signal TR is given. The pad 230 is a pad to which a clock signal CLK is given. The pad 235 is a pad electrically connected to a current supply line 700. In addition, the imaging apparatus has a configuration which causes less sharp potential fluctuation on the current supply line 700 which supplies electric current based on a power supply voltage VDD by connecting a capacitance 237 to the power supply voltage VDD. The common current supply line 700 which supplies electric current based on the power supply voltage VDD is electrically connected to the chips 100 and 101. Accordingly, the common power supply voltage VDD is supplied to the chips 100 and 101.

The chips 100 and 101 each include a current consumption circuit 190. The current consumption circuit 190 operates based on a signal φ2 provided from a control unit 150. The power supply voltage VDD is provided to the current consumption circuit 190. The power supply voltage VDD of the current consumption circuit 190 may be provided via the pad 235, or may be provided from a different pad other than the pad 235. In other words, any form can be employed as long as the current consumption circuit 190 and the output circuit described below are electrically connected in common with respect to a power source which supplies the power supply voltage VDD and is provided on the outside of the chip 100. As an example of such a form, there is a form in which the current consumption circuit 190 and the output circuit are electrically connected to the common current supply line 700.

The chips 100 and 101 each include an inverter 160, the MOS transistors 170 and 180, and the control unit 150. In the chip 100, the select signal supplied to the pad 210 is provided to the control unit 150, the MOS transistor 180, and the inverter 160 respectively. To the MOS transistor 180 a signal φ1 is provided from the control unit 150. Further, the trigger signal TR provided to the pad 220, and the clock signal CLK provided to the pad 230 each are provided to the control unit 150.

The chips 100 and 101 each include pixels 110 to 113. To each of the pixels 110 to 113 a signal φ3 is provided from the control unit 150. In addition, the chips 100 and 101 each include shift registers 130 to 133. The shift registers 130 to 133 are scanning circuits according to the present exemplary embodiment. The shift registers 130 to 133 are supplied a signal φ4 from the control unit 150. The shift registers 130 to 133 respectively output signals φ5 to φ8 generated based on the signal φ4 supplied from the control unit 150 to MOS transistors 120 to 123, and sequentially drive the MOS transistors 120 to 123. Accordingly, the signals of the pixels 110 to 113 are sequentially output to an amplifier 140. A signal φ9 is provided to the amplifier 140 from the control unit 150. The amplifier 140 outputs a signal to a pad 250, and a signal VOUT output by the amplifier 140 is output from the pad 250. The amplifier 140 is an output circuit according to the present exemplary embodiment.

The shift register 133 outputs a signal φ10 to the control unit 150 and to the pad 240 respectively. A signal φ10-1 output from the pad 240-1 of the chip 100 is supplied to the pad 200-2 of the chip 101. An inverter 160-2 is supplied in advance with a signal at a ground level from the pad 210-2, and outputs a signal at the H level to a MOS transistor 170-2, so that the MOS transistor 170-2 is turned on. Therefore, when the signal φ10-1 at the H level is provided to the pad 200-2, the shift registers 130 to 133 of the chip 101 sequentially generate the signals φ5 to φ8 and sequentially drive the MOS transistors 120 to 123. In this manner, after an amplifier 140-1 has output a signal based on an optical signal of each of pixels 110-1 to 113-1 of the chip 100, an amplifier 140-2 outputs a signal based on an optical signal of each of pixels 110-2 to 113-2 of the chip 101. A signal reading unit 600 of the imaging apparatus according to the present exemplary embodiment includes the shift registers 130 to 133, the MOS transistor 120, and the amplifier 140. The current consumption circuit 190 according to the present exemplary embodiment is provided as a circuit different from the pixels 110 to 113, the signal reading unit 600, and the control unit 150.

Next, operations of the chip 100 will be described with reference to FIG. 2. To a pad 210-1, the select signal SEL at the H level is provided in advance.

At time t1, the trigger signal TR is set to the H level. Accordingly, the control units 150 of the respective chips 100 and 101 causes the pixels 110 to 113 to perform a preparation operation for outputting a photoelectric conversion signal based on incident light. Then, the trigger signal TR is set to a Low level (hereinbelow, denoted as L level). Further, signals φ2-1 and φ2-2 are set to the H level. Accordingly, the current consumption circuits 190 provided on the respective chips 100 and 101 perform operations, and consume electric current.

At time t2, the signals φ2-1 and φ2-2 are set to the L level, and the current consumption circuit 190 is set to a non-operation state. Further, a signal φ1-1 is sets to the H level. In the chip 100, a MOS transistor 170-1 is turned off, and a MOS transistor 180-1 is turned on. Accordingly, the signal at the H level is provided to the shift registers 130-1, 131-1, 132-1, and 133-1. Further, a signal φ9-1 is set to the H level at the time t2. Accordingly, the amplifier 140-1 goes into the operation state. Further, a control unit 150-1 starts generation of a signal φ4-1 synchronized with the clock signal CLK. A period from the time t1 to the time t2 is referred to as a blanking period. A first state of the output circuit according to the present exemplary embodiment refers to the state of the output circuit during the blanking period. In other words, the state in which the amplifier 140-1 is in a non-operation state is the first state according to the present exemplary embodiment.

At time t3, the shift register 130-1 sets a signal φ5-1 to the H level based on the signal φ4-1. Accordingly, a signal generated by the pixel 110-1 is output to the outside of the chip via a pad 250-1 via the amplifier 140-1.

Then, based on the signal φ4-1, the shift registers 131-1, 132-1, and 133-1 set signals φ6-1, φ7-1, and φ8-1 to the H level at times t4, t5, and t6, respectively. Accordingly, the signals generated by the pixels 111-1, 112-1, and 113-1 are sequentially output from the amplifier 140-1 to the outside of the chip via the pad 250-1.

A period from the time t3 to the time t7 is referred to as an output period 1.

At the time t7, the shift register 133-1 sets the signal φ10-1 to the H level. Accordingly, a control unit 150-2 of the chip 101 sets a signal 9-2 to the H level, and sets the amplifier 140-2 to an operation state. Further, the control unit 150-2 starts generation of a signal φ4-2 synchronized with the clock signal CLK.

Similarly to the above-described operation in the chip 100, also in the chip 101, shift registers 130-2, 131-2, 132-2, and 133-2 set signals φ5-2, φ6-2, φ7-2, and φ8-2 to the H level based on the signal φ4-2 at times t8, t9, t10, and t11, respectively. Accordingly, the signals of the pixels 110-2, 111-2, 112-2, and 113-2 are sequentially output from the amplifier 140-2 to the outside of the chip via a pad 250-2. A period from the time t6 to the time 11 is referred to as an output period 2. The output period 2 is a period during which the chip 101 outputs the signal VOUT. A second state of the output circuit according to the present exemplary embodiment refers to the state of the output circuit during the output period. In other words, the state in which the amplifier 140 operates is the second state according to the present exemplary embodiment. The output circuit according to the present exemplary embodiment selectively operates between the first state and the second state.

Operations of the current consumption circuit 190 according to the present exemplary embodiment will be further described in below.

Figure 2:
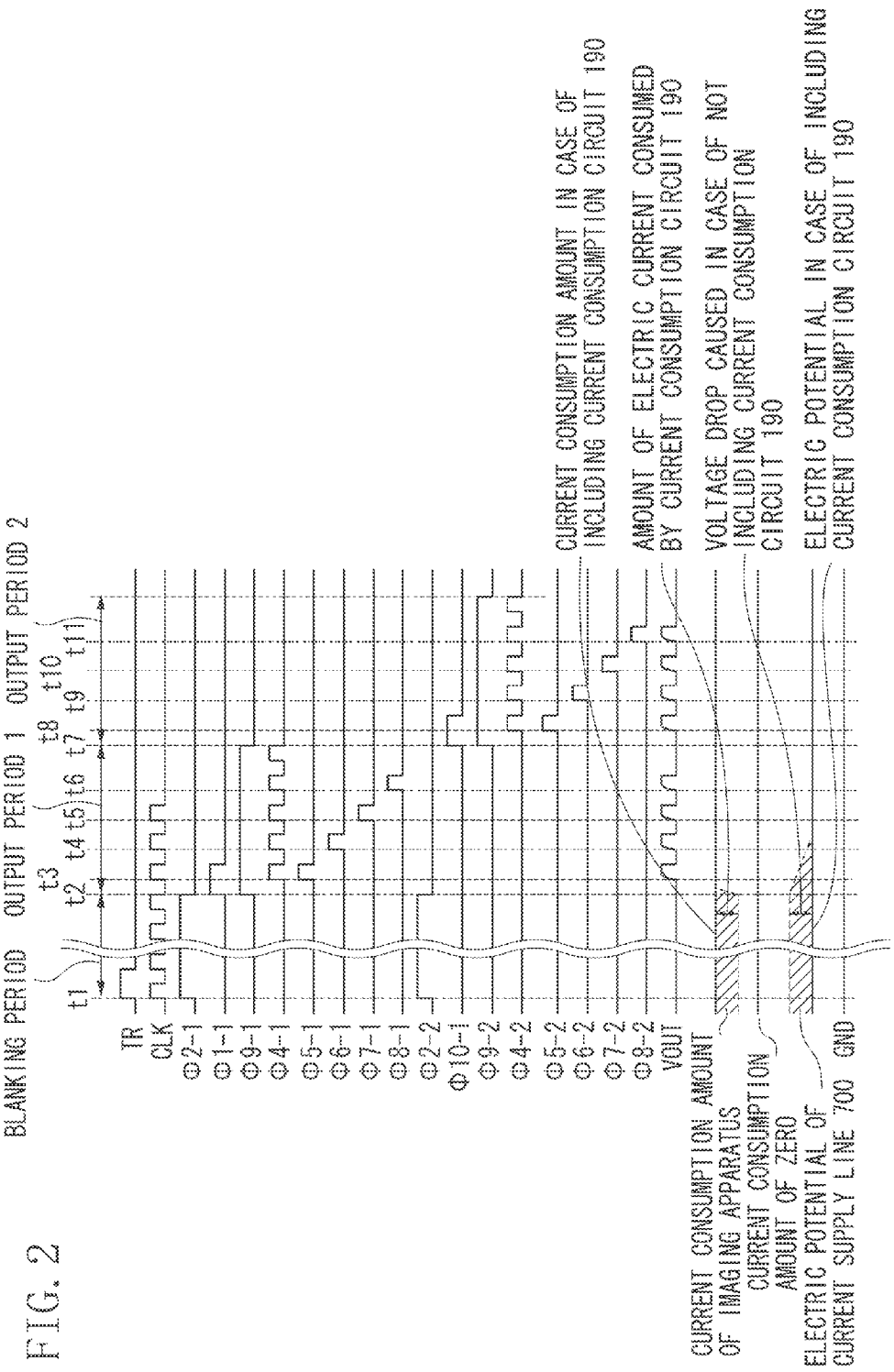
FIG. 2 is a timing chart illustrating an example of operations of the imaging apparatus.

In FIG. 2, a current consumption amount of the imaging apparatus including the chips 100 and 101, and an electric potential of the power supply voltage VDD connected in common to the chips 100 and 101 are illustrated. A current consumption amount and a potential of the power supply voltage VDD of an imaging apparatus which does not include the current consumption circuit 190 are indicated by dotted lines. In the imaging apparatus which does not include the current consumption circuit 190, there are circuits, including the amplifier 140 and the shift registers 130 to 133, in non-operation states during the blanking period, and therefore the current consumption amount is less compared with that during the output period. Therefore, when shifting from the blanking period to the output period 1, the current consumption amount of the imaging apparatus increases along with the increase of the current consumption amount of the chip 100. Along with the fluctuation in the current consumption amount, the electric potential of the current supply line 700 which supplies electric current based on the power supply voltage VDD will fluctuate. When the pixels and the amplifier 140 output signals in a period during which the electric potential of the current supply line 700 fluctuates, the signals output by the pixels and the amplifier 140 will fluctuate by the fluctuation in the electric potential of the current supply line 700. Because of the fluctuation of the electric potential of the current supply line 700, accuracy of the signals output from the pixels and the amplifier 140 may be deteriorated.

According to the present exemplary embodiment, the current consumption circuit 190 consumes electric current during the blanking period, so as to reduce a difference between amounts of electric current consumed by the output circuit during the blanking period and during the output period. Accordingly, the fluctuation in the current consumption amounts of the chip during the blanking period and during the output period can be reduced. Further, by reducing the fluctuation in the current consumption amount of the chip, the fluctuation in the current consumption amounts of the imaging apparatus during the blanking period and during the output period can be reduced. The reduction of the fluctuation in the current consumption amounts of the imaging apparatus during the blanking period and during the output period can reduce the fluctuation in the electric potential of the current supply line 700. Therefore, accuracy of the signals output from the pixels and the amplifier 140 can be less likely to be deteriorated. A desirable form is a form in which the current consumption amounts of the imaging apparatus during the blanking period and during the output period match with each other.

Figure 1B:
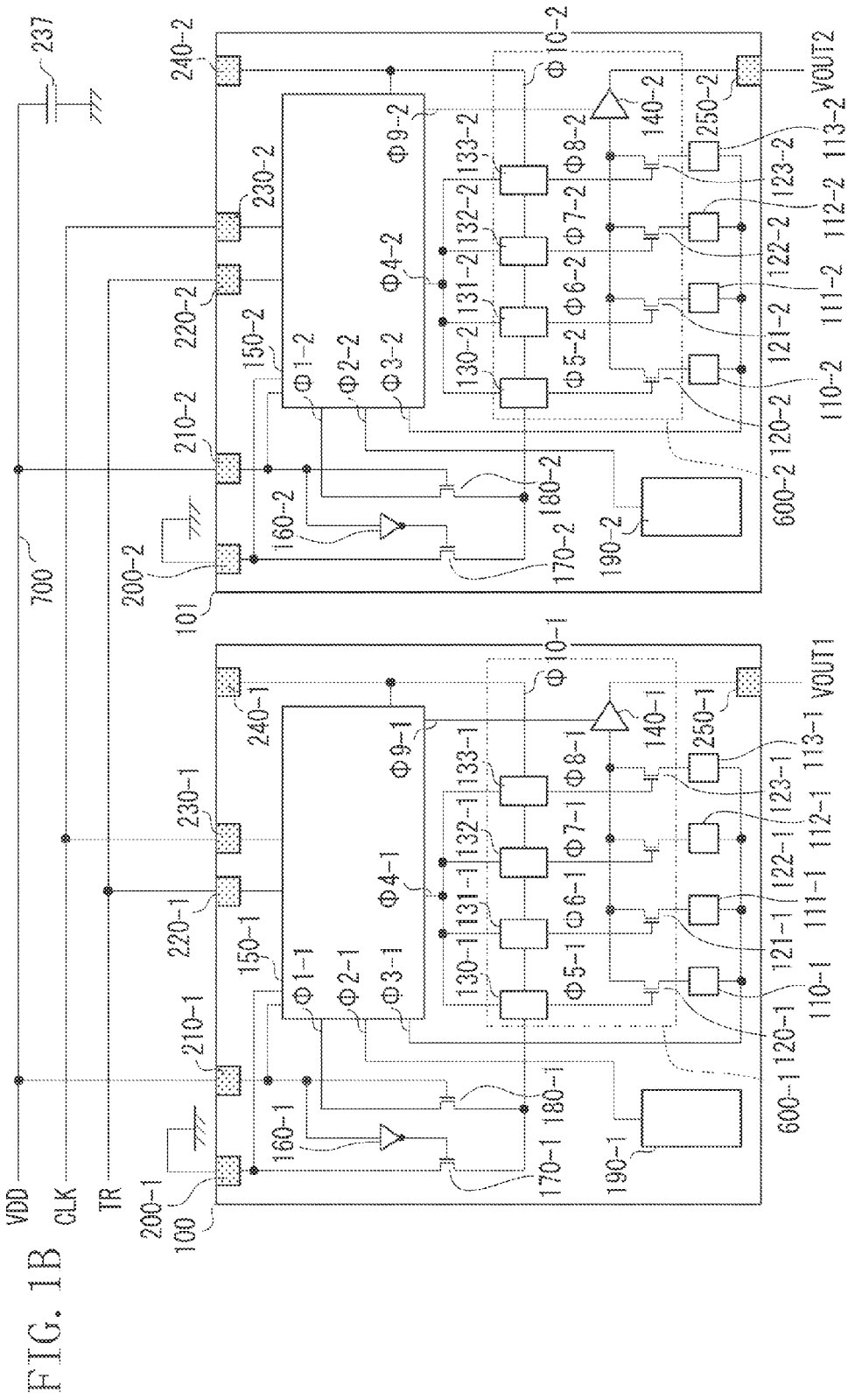
FIG. 1B is a schematic diagram illustrating an example of a configuration of an imaging apparatus.

Another form of the imaging apparatus is illustrated in FIG. 1B. The other form has a configuration in which the power supply voltage VDD is provided to the pad 210.

The configuration in which the power supply voltage VDD is provided to the pad 210 will be described. Since the power supply voltage VDD is provided to the pad 210, the MOS transistor 170 is turned off, and the MOS transistor 180 is turned on. The shift registers 130 to 133 of the respective chips 100 and 101 start operations when the signal φ1 is set to the H level. If the signals φ1 are simultaneously set to the H level by the control unit 150 of the respective chips 100 and 101, the chips 100 and 101 simultaneously shift from the blanking period to the output period. Therefore, fluctuation amount of the current consumption amounts at the time of simultaneously shifting from the blanking period to the output period is doubled, compared with a case that the imaging apparatus according to the first exemplary embodiment does not include the current consumption circuit 190. In the imaging apparatus in FIG. 1B, the current consumption amount of the current consumption circuit 190 during the blanking period is set twice as much as that in the imaging apparatus in FIG. 1A. Accordingly, the fluctuation in the current consumption amounts of the imaging apparatus during the blanking period and during the output period can be reduced.

In this manner, the chip according to the present exemplary embodiment can set the current consumption amount of the current consumption circuit 190 according to the number of chips which shift from the blanking period to the output period. Therefore, the current consumption amount of the current consumption circuit 190 during the blanking period can be increased according to an increase in the number of the chips which shift from the blanking period to the output period. Accordingly, the fluctuation in the current consumption amounts of the imaging apparatus during the blanking period and during the output period can be reduced.

According to the present exemplary embodiment, a configuration in which the current consumption circuit 190 is provided is described. However, the present exemplary embodiment is not limited to this configuration. For example, without providing the current consumption circuit 190, the current consumption amount of all of the plurality of pixels, that is, a sum of the current consumption amounts of the pixels 110 to 113 may be increased during the blanking period. When the pixels 110 to 113 shift from the blanking period to the output period, the current consumption amounts of the pixels 110 to 113 are reduced. However, an increase of the current consumption amount of the amplifier 140 from the blanking period to the output period is larger than a decrease of the sum of the current consumption amounts of the pixels 110 to 113. Therefore, the current consumption amount of the chip is larger during the output period than during the blanking period. In order to reduce the fluctuation in the current consumption amount of the chip, the plurality of pixels, that is, the pixels 110 to 113 are caused to perform other operations for consuming electric current, in addition to the operation involved in generation of the optical signals of the pixels during the blanking period. In other words, the current consumption amounts of all of the plurality of the pixels during the blanking period are increased than a case of performing only an operation involved in generation of the optical signals. Accordingly, if the current consumption amount of the output circuit increases after shifting from the blanking period to the output period, the fluctuation in the current consumption amount of the chip can be reduced.

According to the present exemplary embodiment, a form for using the shift register is described as an example of the scanning circuit, however the present exemplary embodiment is not limited to this form. For example, the scanning circuit may be a decoder as another form.

An imaging apparatus according to a second exemplary embodiment will be described below with reference to the drawings.

An imaging apparatus according to the present exemplary embodiment can be similar to the imaging apparatus according to the first exemplary embodiment which is described with reference to FIG. 1A.

Figure 3A:
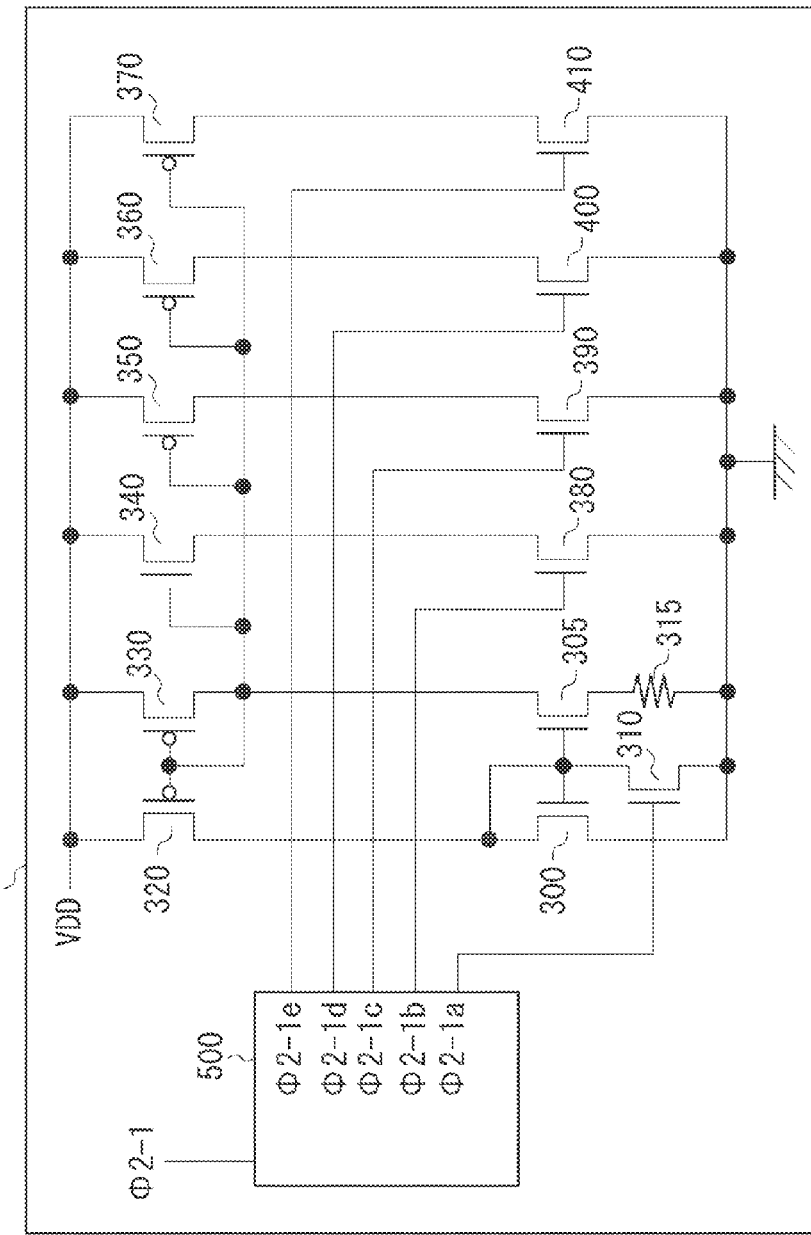
FIG. 3A is a schematic diagram illustrating an example of a configuration of a current consumption circuit.

FIG. 3A illustrates an equivalent circuit of an example of the current consumption circuit 190 according to the present exemplary embodiment. FIG. 3A illustrates the current consumption circuit 190-1 included in the chip 100.

The current consumption circuit 190 in FIG. 3A includes MOS transistors 300, 305, 310, 320, 330, 340, 350, 360, 370, 380, 390, 400, and 410, and a resistive element 315. Further, the current consumption circuit 190 includes a current consumption control unit 500. The current consumption control unit 500 is supplied with the signal φ2-1 from the control unit 150. When the signal φ2-1 at the H level is provided, the current consumption control unit 500 outputs signals φ2-1a, 2-1b, 2-1c, 2-1d, and 2-1e which respectively control ON-OFF of the MOS transistors 310, 380, 390, 400, and 410.

The current consumption amount of the current consumption circuit 190 in FIG. 3A will be described below. First, an equation expressing a drain current of the MOS transistor is give as follows.

[Equation 1]

$$I_d = \frac{\beta}{2}(V_{gs} - V_{th})^2 \quad (1)$$

Where, $V_{gs}$ is a voltage between gate-sources of a MOS transistor, and $V_{th}$ is a threshold value voltage of the MOS transistor. Further, β is given in the following equation.

[Equation 2]

$$\beta = \mu_0 C_{ox} \frac{W}{L} \quad (2)$$

Where, $\mu_0$ is mobility of a carrier, $C_{ox}$ is a gate capacitance per unit area of the MOS transistor, W is a gate width of the MOS transistor, and L is a gate length of the MOS transistor.

In FIG. 3A, when a gate-source voltage of the MOS transistor 300 is $V_{gs}1$, a gate-source voltage of the MOS transistor 305 is $V_{gs}2$, and a resistance value of the resistive element 315 is R, a drain current Id of the MOS transistor 305 is given as $(V_{gs}1-V_{gs}2)/R$. Further, assuming that the gate widths and the gate lengths of the MOS transistor 320 and the MOS transistor 330 are equal to each other, a drain current of the MOS transistor 300 is similarly given as $(V_{gs}1-V_{gs}2)/R$. When the gate-source voltages $V_{gs}1$ and $V_{gs}2$ are eliminated from equation (1), an equation is given as follows.

[Equation 3]

$$I_d = \frac{\sqrt{\frac{2I_d}{\beta_1}} - \sqrt{\frac{2I_d}{\beta_2}}}{R} \quad (3)$$

Where, β1 is β of the MOS transistor 300, β2 is β of the MOS transistor 305. From the equation (3), drain currents Ids of the MOS transistors 300 and 305 are determined by the gate widths and the gate lengths of the MOS transistors 300 and 305 and a resistance value of the resistive element 315. It is assumed that the MOS transistor 310 is turned off, and the MOS transistors 380, 390, 400, and 410 are turned on. If the gate widths and the gate lengths of the MOS transistors 340, 350, 360, and 370 are equal to those of the MOS transistors 320 and 330, the current consumption amount of the current consumption circuit 190 will be about 6×Id. On the other hand, when the MOS transistor 310 is turned on, gate potentials of the MOS transistors 300 and 305 drop down to the ground potential. Accordingly, the current consumption amount of the current consumption circuit 190 will be nearly zero. Therefore, during the blanking period, the MOS transistor 310 is turned off, and the MOS transistors 380, 390, 400, and 410 are turned on according to a required current consumption amount. Then, during the output period, the MOS transistor 310 is turned on, and the MOS transistors 380, 390, 400, and 410 are turned on according to a required current consumption amount. Accordingly, the fluctuation in the current consumption amount of the imaging apparatus when shifting from the blanking period to the output period can be reduced.

In the current consumption circuit 190 according to the present exemplary embodiment, the current consumption amount of the current consumption circuit 190 can be varied by changing the number of transistors to be turned on among the MOS transistors 380, 390, 400, and 410. The number of transistors to be turned on only needs to be input current consumption setting data in advance to the current consumption control unit 500 from the outside of the chips 100 and 101. When the current consumption setting data is input from the outside of the chips 100 and 101, the current consumption setting data is input to, for example, the pad 220 to which the trigger signal TR in FIG. 1A is provided. Accordingly, it becomes possible to set the current consumption amount of the current consumption circuit 190, without the need to increase the number of pads.

FIG. 3B is an example of a timing chart. As a pad 220-1 input-signal, the trigger signal TR which is a start of the blanking period, and the current consumption setting data which is provided after input of the trigger signal TR are provided in a serial manner. The pad 220-1 input-signal is denoted as the signal [1] in below.

Signals [2] to [7] in FIG. 3B are signals obtained by shifting the signal [1] by one clock period in order from the shift register. A signal [8] is obtained by taking a logical sum (OR) of the signals [3], [4], [5], and [6]. By taking a logical product (AND) of the signals [1] and [8], the current consumption setting data can be obtained. Further, by taking the AND of a logical negation (NOT) of the signal [8] which is an inversion signal of the signal [8] and of the signal [1], the trigger signal TR can be obtained. Accordingly, serial signals of the trigger signal TR and the current consumption setting data can be converted into parallel signals. The current consumption control unit 500 can control the current consumption amount of the current consumption circuit 190 based on the provided current consumption setting data.

Figure 4A:
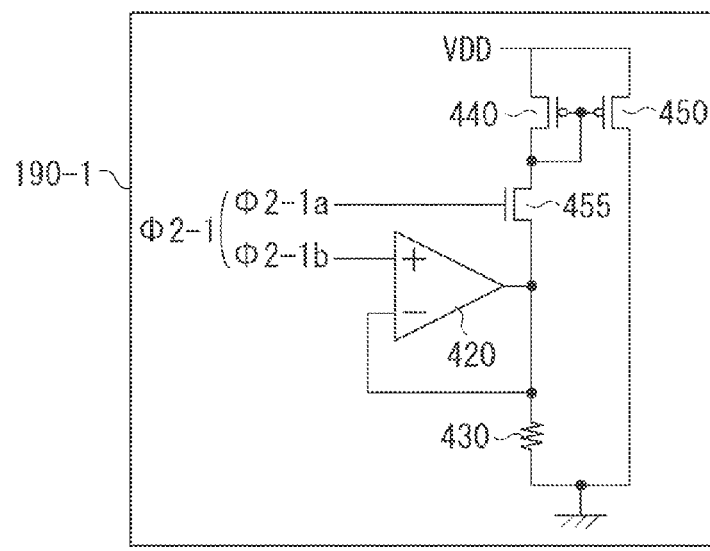
FIG. 4A is a schematic diagram illustrating an example of the current consumption circuit.

FIG. 4A illustrates an equivalent circuit of a current consumption circuit 190-1 of another form.

The current consumption circuit 190-1 in FIG. 4A includes a resistive element 430, MOS transistors 440, 450, and 455, and an operational amplifier 420. The signal φ2-1 includes a signal φ2-1a which perform ON-OFF control of the MOS transistor 455 and a bias signal φ2-1b.

It is assumed that a potential of the bias signal φ2-1b is VREF, a resistance value of the resistive element 430 is R, and gate widths and gate lengths of the MOS transistor 440 and the MOS transistor 450 are equal to each other. When the MOS transistor 455 is turned on, a current consumption amount will be about (2×VREF)/R. If the MOS transistor 455 is turned off from this state, the current consumption amount will be about zero. In this manner, the current consumption amount of the current consumption circuit 190 can be varied between the blanking period and during the output period.

Further, the current consumption amount of the current consumption circuit 190 can be varied by changing a value of the potential VREF of the bias signal φ2-1b from the outside of the chips 100 and 101. Since a value of the voltage VREF of the bias signal φ2-1b is not discrete but continuous value, the current consumption amount of the current consumption circuit 190 can be finely controlled.

Figure 4B:
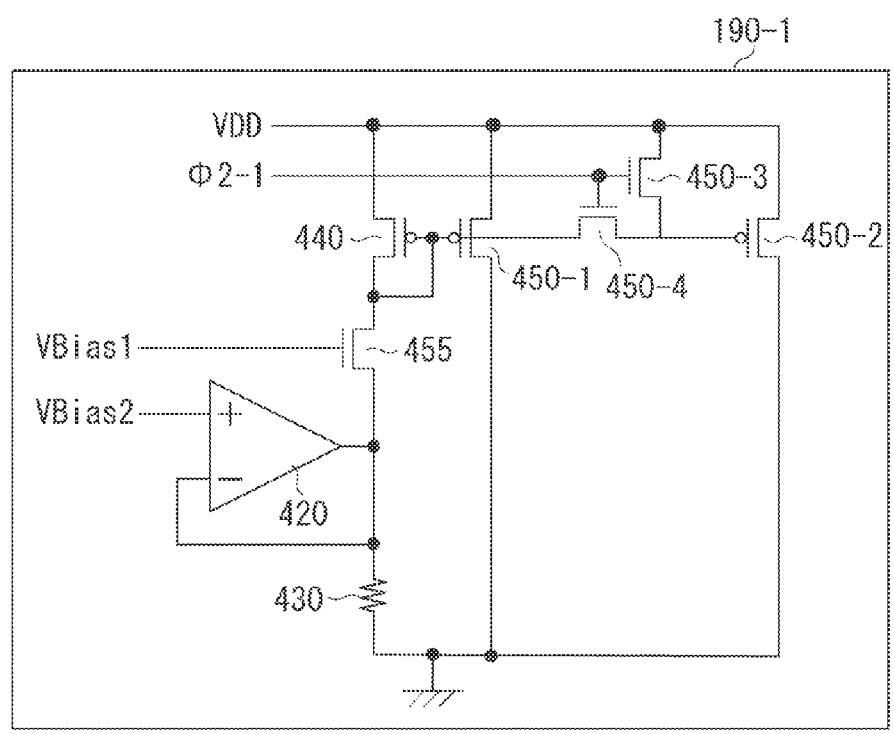
FIG. 4B is a schematic diagram illustrating an example of the current consumption circuit.

As another form, the current consumption circuit 190 illustrated in FIG. 4B can be used. In the current consumption circuit 190-1 in FIG. 4B, a voltage VBias1 is provided to the MOS transistor 455, and the MOS transistor 455 is turned on. In addition, a voltage VBias2 is provided to a non-inversion input terminal of the operational amplifier 420. Further, the current consumption circuit 190-1 includes a MOS transistor 450-1 in place of the MOS transistor 450. Furthermore, the current consumption circuit 190-1 includes MOS transistors 450-2, 450-3, and 450-4. The MOS transistors 450-3 and 450-4 are turned on when the signal φ2 is set to the H level. In the current consumption circuit 190, when the signal φ2 is set to the H level, the MOS transistor 450-2 is turned on. Accordingly, the current consumption of the current consumption circuit 190-1 increases, compared with a case where the signal φ2 is at the L level.

In FIG. 4B, a form in which a drain current of the MOS transistor 450-1 is flown into a ground is illustrated. As another form, there is a form in which the drain current of the MOS transistor 450-1 is used as a supply current to the amplifier 140 in FIG. 1A. In this form, it is possible to associate process fluctuation or temperature fluctuation of the current consumption amount of the current consumption circuit 190 with an output of the amplifier 140. For example, the current consumption amount of each of the amplifier 140 and the current consumption circuit 190 will change in association with fluctuation in the resistance value of the resistive element 430 in FIG. 4B. Accordingly, if the process fluctuation or the temperature fluctuation occurs in the resistance value of the resistive element 430, it is easier to match an increase in the current consumption amount by the amplifier 140 and the current consumption amount of the current consumption circuit 190 when shifting to the output period. Accordingly, the fluctuation in the current consumption amount when the imaging apparatus shifts from the blanking period to the output period can be reduced.

According to the first exemplary embodiment, a form in which the current consumption amount of the current consumption circuit 190 is controlled based on the current consumption setting data from the outside of the chips 100 and 101 via the control unit 150 is described. The current consumption circuit 190 according to the present exemplary embodiment, as another form, can directly input the bias signal φ2-1b in FIG. 4A, and the voltage VBias2 in FIG. 4B from the outside of the chips. Then, the current consumption amount of the current consumption circuit 190 can be changed by changing voltage values of the bias signal φ2-1b in FIG. 4A and the voltage VBias2 in FIG. 4B.

An imaging apparatus according to a third exemplary embodiment will be described below mainly focusing on differences from the first exemplary embodiment with reference to the drawings.

FIG. 5A illustrates the imaging apparatus according to the present exemplary embodiment. In FIG. 5A, members having the same functions as those in FIG. 1A are indicated with the same reference numerals as those in FIG. 1A. Also in the present exemplary embodiment, the signal reading unit 600 includes the shift registers 130 to 133, the MOS transistors 120 to 123, and the amplifier 140.

The imaging apparatus according to the present exemplary embodiment employs a form in which each of a plurality of current consumption circuits 190 is disposed corresponding to each column of the pixels 110 to 113 provided in a plurality of columns. In other words, in the chip 100, a current consumption circuit 190-1a is disposed in a column on which the pixel 110-1 is disposed. Similarly, in the chip 100, current consumption circuits 190-1b, 190-1c, and 190-1d are disposed in respective columns in which the pixels 111-1, 112-1, and 113-1 are disposed. A sum of the current consumption amounts of the current consumption circuits 190-1a to 190-1d is equal to the current consumption amount of the current consumption circuit 190-1 illustrated in FIG. 1A according to the first exemplary embodiment. In this form, compared with the imaging apparatus according to the first exemplary embodiment, the current consumption circuits 190 serving as a heating source are disposed in a distributed manner corresponding to the columns of the pixels within the chip. This form has an effect of facilitating to evenly distribute heat which each of the pixels within the chip receives, compared with the imaging apparatus according to the first exemplary embodiment. Accordingly, dispersion of noise components included in the signal output by each pixel which is generated by heat of the imaging apparatus can be reduced.

The operation of the imaging apparatus according to the present exemplary embodiment can be similar to the operation of the imaging apparatus according to the first exemplary embodiment.

An imaging apparatus according to a fourth exemplary embodiment will be described below mainly focusing on differences from the first exemplary embodiment with reference to the drawings.

Figure 5B:
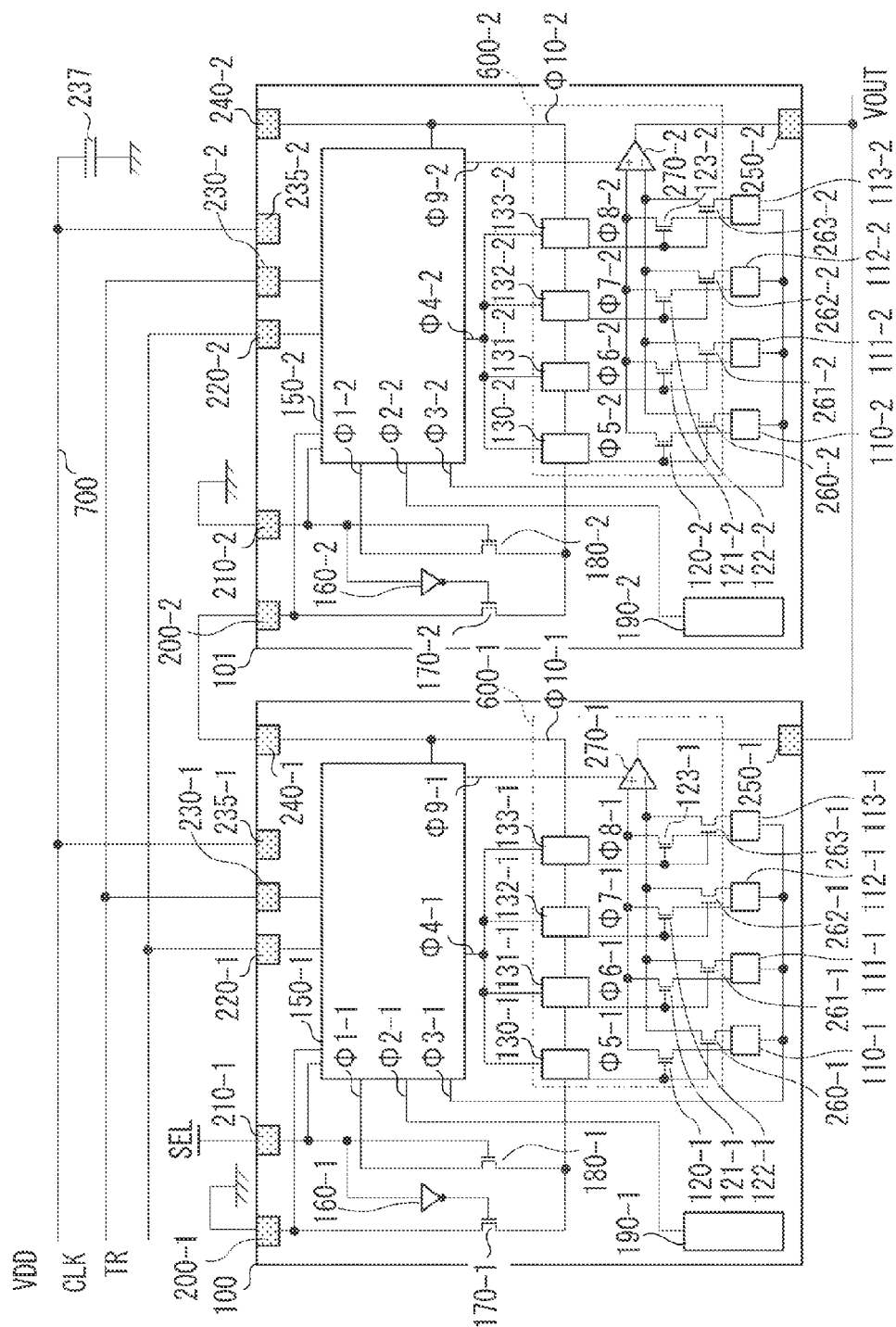
FIG. 5B is a schematic diagram illustrating an example of a configuration of the imaging apparatus.

FIG. 5B illustrates the imaging apparatus according to the present exemplary embodiment. In FIG. 5B, members having the same functions as those in FIG. 1A are indicated with the same reference numerals as those in FIG. 1A. In the imaging apparatus illustrated in FIG. 5B, the chips 100 and 101 include MOS transistors 260 to 263, respectively. The MOS transistors 260 to 263 are respectively driven by the signals φ5 to φ8, similarly to the MOS transistors 120 to 123. Further, the imaging apparatus in FIG. 5B includes a differential amplifier 270 in place of the amplifier 140 in the imaging apparatus in FIG. 1A. The differential amplifier 270 is an output circuit according to the present exemplary embodiment. The signal reading unit 600 according to the present exemplary embodiment includes the shift registers 130 to 133, the MOS transistors 120 to 123, the MOS transistors 260 to 263, and the differential amplifier 270.

Figure 6A:
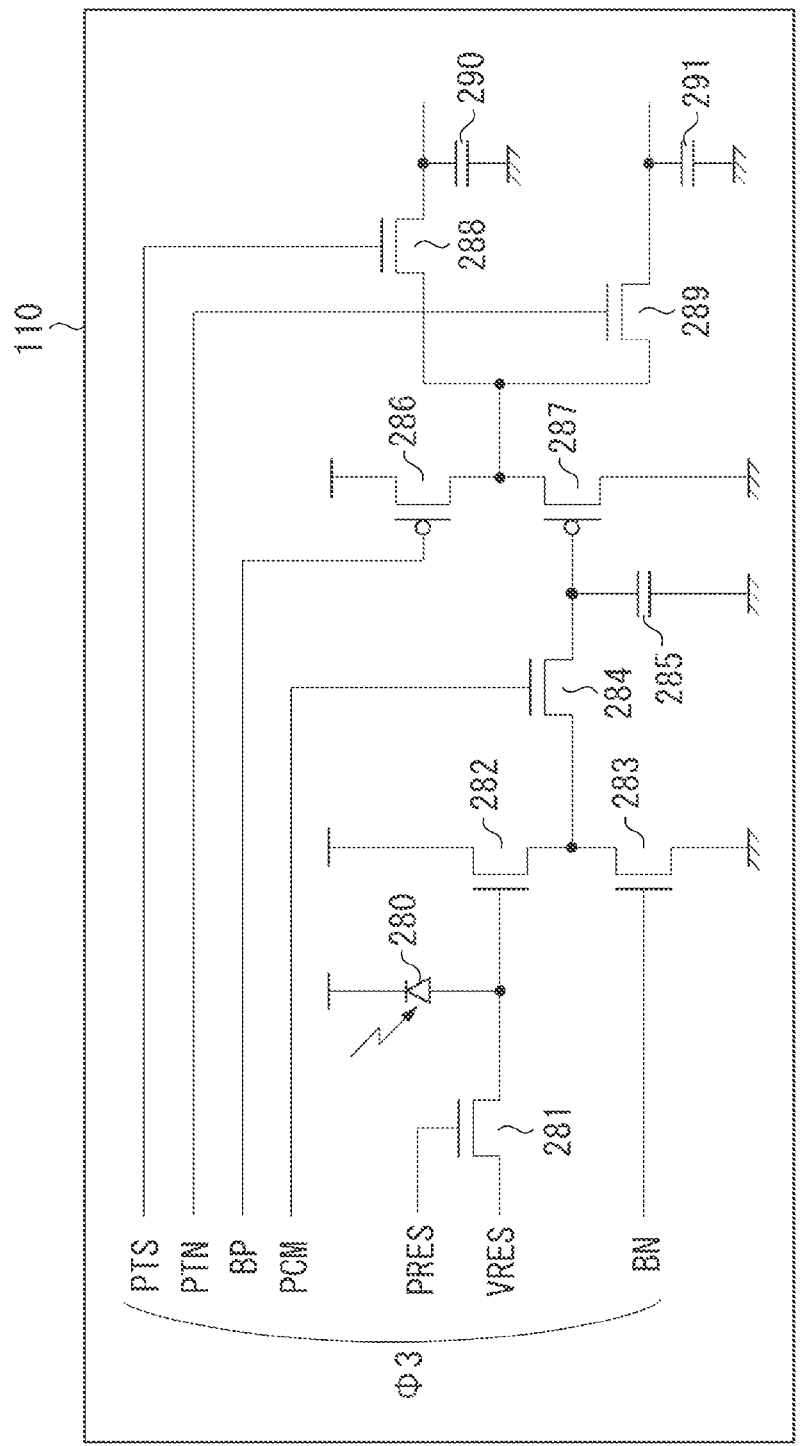
FIG. 6A is a schematic diagram illustrating an example of a configuration of a pixel.

FIG. 6A illustrates a configuration of a pixel 110 according to the present exemplary embodiment. The configuration of pixels 111 to 113 can be also similar to the configuration of the pixel 110.

The pixel 110 includes a photoelectric conversion element 280, MOS transistors 281, 282, 283, 284, 286, 287, 288, and 289, and capacitance elements 285, 290, and 291. The signal φ3 includes signals PTS, PTN, PCM, and PRES, and bias signals BP, BN, and VRES which switch ON-OFF of the MOS transistors. The MOS transistor 283 operates as a current source by the bias signal BN, and constitutes a source follower circuit together with the MOS transistor 282. The MOS transistor 286 operates as a current source by the bias signal BP, and constitutes a source follower circuit together with the MOS transistor 287. The voltage VRES is a reset voltage of the photoelectric conversion element 280.

Figure 6B:
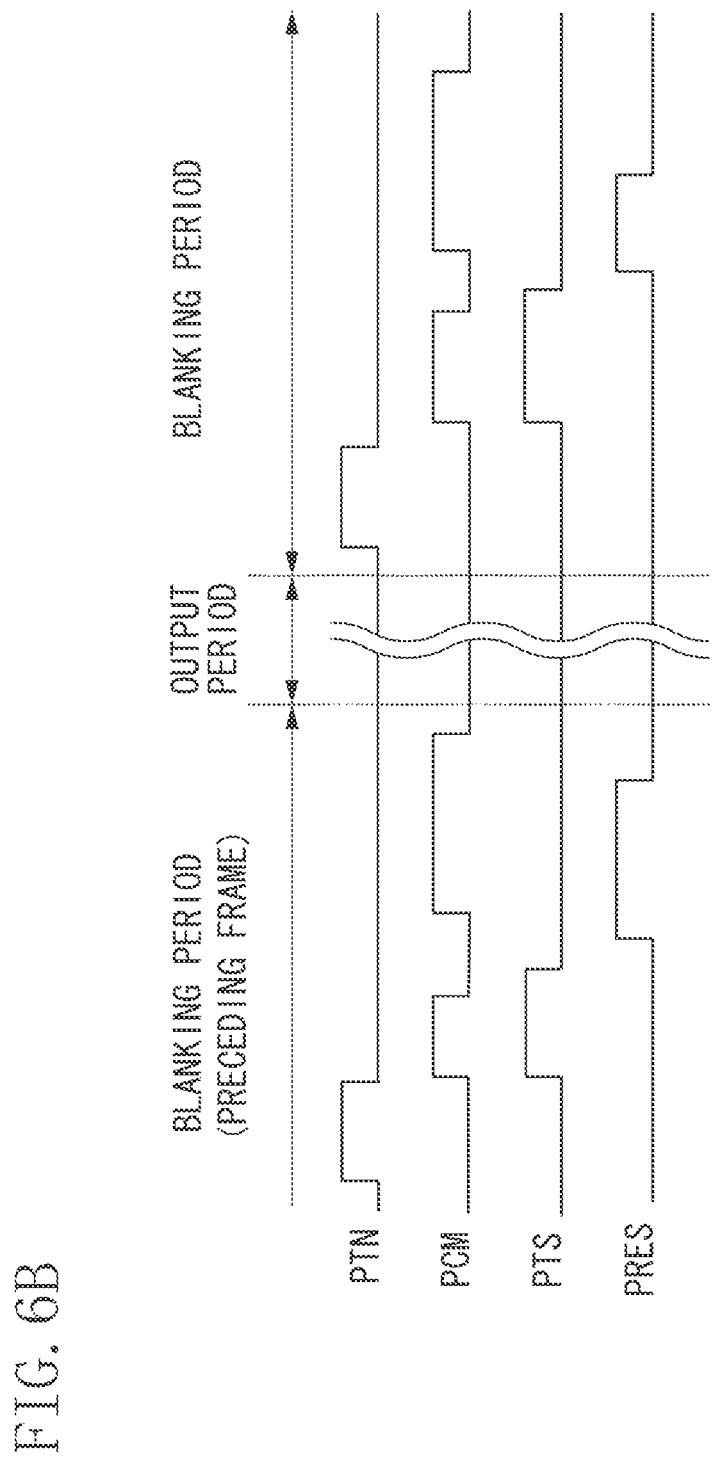
FIG. 6B is a timing chart illustrating an example of operations of a pixel.

FIG. 6B is a timing chart illustrating operations of the pixel during the blanking period. At the start of the blanking period, the imaging apparatus is in a state in which the capacitance element 285 holds a noise signal, and the anode of the photoelectric conversion element 280 hold an optical signal. A reason of this state will be described below. During the blanking period of the preceding frame, the MOS transistor 281 is turned on by setting the signal PRES to the H level, and the anode of the photoelectric conversion element 280 is reset to the voltage VRES. Then, the signal PRES is set to the L level, and the MOS transistor 281 is turned off. At that time, a reset noise is held in the anode of the photoelectric conversion element 280. Then, the signal PCM is set to the H level, and a noise signal corresponding to the reset noise is written in the capacitance element 285. Then, the noise signal is held in the capacitance element 285 by setting the signal PCM to the L level and turning off the MOS transistor 284.

In the subsequent output period, the signals PTN, PCM, PTS, and PRES are all set to the L level. During the output period, an optical current is generated in the photoelectric conversion element 280, and an optical signal in which the reset noise is superimposed on a signal by the optical current is held in the anode of the photoelectric conversion element 280. At the start of the blanking period after the output period, the noise signal is held on the capacitance element 285, and the optical signal is held in the anode of the photoelectric conversion element 280. During the blanking period, the noise signal is held in the capacitance element 291 by setting the signal PTN to the H level and turning on the MOS transistor 289. Then, the optical signal is held in the capacitance element 290 by setting the signal PCM and the signal PTS to the H level.

The optical signal of the capacitance element 290 and the noise signal of the capacitance element 291 are output to the differential amplifier 270 during the subsequent output period. The differential amplifier 270 outputs an amplified signal based on a difference between the optical signal and the noise signal. Accordingly, the chip 100 can output a signal with less noise components of the pixel to the outside.

The operations of the imaging apparatus according to the present exemplary embodiment can be similar to the operations described with reference to FIG. 2 in the first exemplary embodiment. The imaging apparatus according to the present exemplary embodiment can obtain the similar effect to those in the imaging apparatus according to the first exemplary embodiment.

An imaging apparatus according to a fifth exemplary embodiment will be described below mainly focusing on differences from the first exemplary embodiment with reference to the drawings.

Figure 7A:
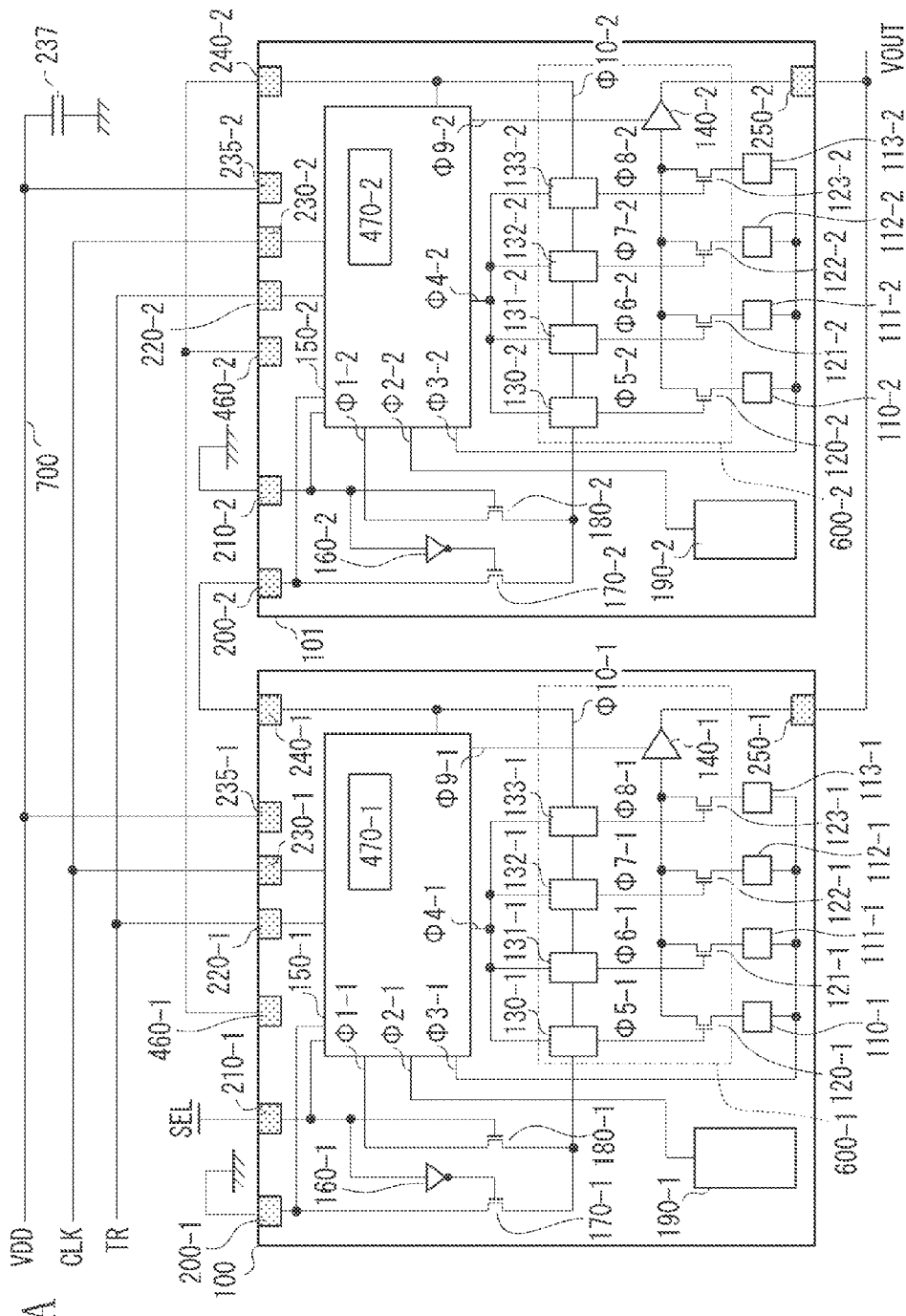
FIG. 7A is a schematic diagram illustrating an example of a configuration of the imaging apparatus.

FIG. 7A illustrates an example of a configuration of the imaging apparatus according to the present exemplary embodiment. In FIG. 7A, members having the same functions as those in FIG. 1A are indicated with the same reference numerals as those in FIG. 1A.

In the imaging apparatus according to the present exemplary embodiment, the chips 100 and 101 each include a pad 460. To the pad 460, a signal φ10-2 output from a pad 240-2 is provided. In addition, the control units 150 of the respective chips 100 and 101 include a counter 470. The counters 470 of the respective chips 100 and 101 count a period since the trigger signal TR is set to the H level until the signal φ10-2 provided to the pad 460 becomes the H level. A usage form of a counting result will be described.

Information of a period since the trigger signal TR is set to the H level until the signal φ10 becomes the H level per chip (hereinbelow, denoted as one-chip period information) is input to the control unit 150 in advance. Then, in the case of the form in FIG. 7A, since a counting result of the counter 470 becomes twice as much as the one-chip period information which has been input to the control unit 150 in advance, the control unit 150 recognizes that the number of chips to be driven by one trigger signal TR is two. The control unit 150 can set a current consumption amount of the current consumption circuit 190 based on data of the recognized number of chips. Accordingly, instead of providing the current consumption setting data from the outside of the chips 100 and 101, the chip itself can set the current consumption amount.

Figure 7B:
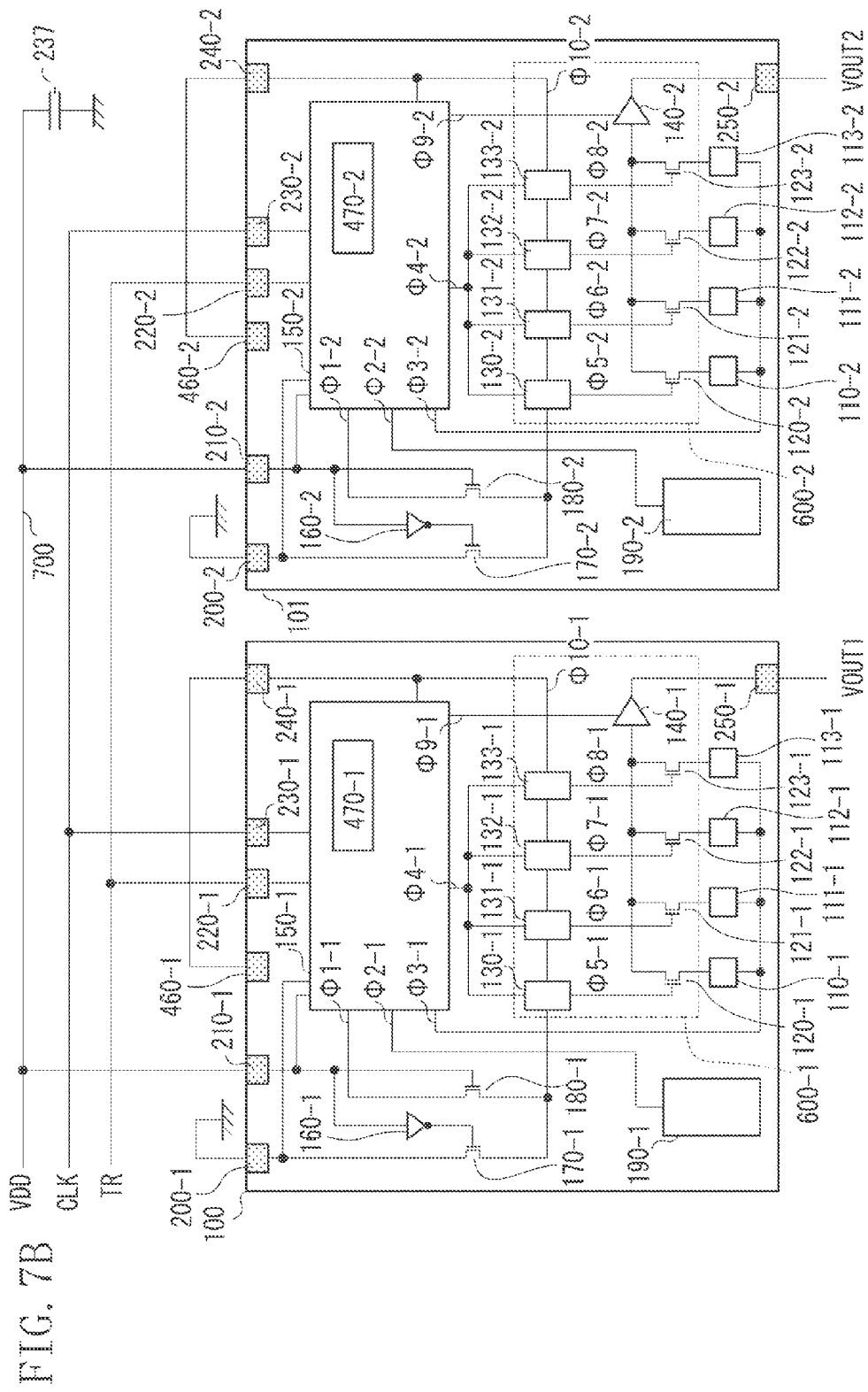
FIG. 7B is a schematic diagram illustrating an example of a configuration of the imaging apparatus.

FIG. 7B illustrates an imaging apparatus of another form. In FIG. 7B, members having the same functions as those in FIG. 7A are indicated with the same reference numerals as those in FIG. 7A.

The imaging apparatus in FIG. 7B employs a configuration in which the signal φ10 output by each chip is provided to the pad 460 of its own chip. Further, the imaging apparatus in FIG. 7B employs a configuration in which the power supply voltage VDD is provided to the pad 210.

In the imaging apparatus according to the first exemplary embodiment, the current consumption amount of the current consumption circuit 190 during the blanking period is set twice as much as that in the imaging apparatus according to the first exemplary embodiment based on the current consumption setting data which is provided from the outside of the chips 100 and 101. Accordingly, the fluctuation in the current consumption amounts of the imaging apparatus during the blanking period and during the output period can be reduced. The present exemplary embodiment employs a form in which the current consumption amount of the current consumption circuit 190 can be set, if the current consumption setting data is not provided from the outside of the chips 100 and 101.

Next, a configuration in which the signal φ10 output by each chip is provided to the pad 460 of its own chip will be described.

The counter 470 counts a period since the trigger signal TR has is to the H level until the signal φ10 of its own chip on which the counter 470 is provided becomes the H level.

A signal VOUT1 which the amplifier 140-1 outputs is output from the pad 250-1, and a signal VOUT2 which the amplifier 140-2 outputs is output from the pad 250-2. In other words, in the imaging apparatus in FIG. 7B, the chip 100 and the chip 101 simultaneously perform operations to output the signals VOUT. The counting result of the counter 470 in this operation will be smaller value than that in the form in FIG. 7A. Accordingly, the control unit 150 can recognize that it is an imaging apparatus with a form in which a plurality of chips simultaneously performs output. In other words, if information of the number of chips to be driven by one trigger signal TR or the number of simultaneous operations is not provided to the chip from the outside of the chips 100 and 101, the chip itself can recognize it. Accordingly, the current consumption amount of the current consumption circuit 190 can be set based on the counting result of the counter 470, if information is not provided from the outside of the chips 100 and 101.

The imaging apparatus and a method for driving the imaging apparatus according to each of the above-described exemplary embodiments can reduce noises generated when the output circuit shifts from the first state to the second state.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-220389 filed Oct. 2, 2012, which is hereby incorporated by reference herein in its entirety.

What is claimed is:

1. An imaging apparatus provided with a plurality of chips including a first chip and a second chip, each of the first chip and the second chip comprising:
   a plurality of pixels each configured to photoelectrically convert incident light to generate an optical signal;
   an output circuit configured to output a signal based on the optical signal output from each of the plurality of pixels;
   a current consumption circuit provided separately from the plurality of pixels and the output circuit,
   wherein the first chip and the second chip are electrically connected to a current supply line in common, and a supply current is provided from the current supply line to the output circuit and the current consumption circuit of each of the first chip and the second chip,
   wherein the output circuit of each of the first chip and the second chip consumes more supply current in a second state than in a first state,
   wherein, in a first period in a first case and a second case, the output circuit of each of the first chip and the second chip is in the first state,
   wherein in the first case, the output circuit of the first chip and the output circuit of the second chip operate serially, and in the second case, the output circuit of the first chip and the output circuit of the second chip operate in parallel,
   wherein, in the first case, in a second period after the first period, the output circuit of the first chip is in the second state, and the output circuit of the second chip is in the first state,
   wherein, in the second case, in the second period, the output circuit of each of the first chip and the second chip is in the second state,
   wherein, in the first case and the second case, a current consumption amount of the current consumption circuit of each of the first chip and the second chip in the first period is larger than that in the second period, and
   wherein a current consumption amount of the current consumption circuit of each of the first chip and the second chip in the first period in the second case is larger than a current consumption amount of the current consumption circuit of each of the first chip and the second chip in the first case, such that a difference between a current consumption amount in the first period and a current consumption amount in the second period is reduced.

2. The imaging apparatus according to claim 1, wherein the current consumption circuit operates in the first period and is not in operation in the second state period.

3. The imaging apparatus according to claim 1,
   wherein the first state is a state in which the output circuit is not in operation, and
   wherein the second state is a state in which the output circuit outputs the signal based on the optical signal.

4. The imaging apparatus according to claim 2,
   wherein each of the plurality of chips further includes:
   a scanning circuit configured to cause each of the plurality of pixels to output the optical signal,
   wherein the output circuit outputs the signal based on the optical signal output from each of the plurality of pixels by the scanning circuit,
   wherein the scanning circuit is not in operation in the first state, and
   wherein, in the second state, the scanning circuit is in a state to cause the plurality of pixels to output the optical signal.

5. The imaging apparatus according to claim 1,
wherein the output circuit is a differential amplifier,
wherein each of the plurality of pixels outputs a noise signal and the optical signal, and
wherein the differential amplifier outputs the signal based on a difference between the noise signal and the optical signal output by each of the plurality of pixels.

6. The imaging apparatus according to claim 1, wherein an electric current output from the current consumption circuit is supplied to the output circuit.

7. The imaging apparatus according to claim 1, wherein the current consumption circuit is a circuit that includes a resistive element, and causes the resistive element to consume an electric current.

8. The imaging apparatus according to claim 1, wherein the current consumption circuit is a circuit that consumes an electric current so that current consumption amounts of a corresponding chip in the first state and in the second state become the same.

9. The imaging apparatus according to claim 1,
wherein the plurality of pixels includes a plurality of columns of the pixels,
wherein each of the plurality of chips includes a plurality of the current consumption circuits, and
wherein each of the plurality of current consumption circuits is provided corresponding to a different one of the columns in which the plurality of pixels is provided.

10. The imaging apparatus according to claim 1,
wherein each of the plurality of chips further includes a counter,
wherein the counter is a counter that generates a counting result of counting a period since the plurality of pixels starts generation of the optical signal until the output circuit finishes output of the signal based on the optical signal, and
wherein the imaging apparatus further comprises a current consumption control unit configured to control a current consumption amount of the current consumption circuit in the first state based on the counting result.

11. The imaging apparatus according to claim 1,
wherein each of the plurality of chips includes a pad to which a trigger signal for setting a corresponding chip into the first state is provided from an outside of the chip, and
wherein current consumption setting data based on which a current consumption amount of the current consumption circuit is set, is provided to the pad from the outside of the chip.

\* \* \* \* \*